United States Patent [19]
Ghelfi et al.

[11] Patent Number: 5,158,713
[45] Date of Patent: Oct. 27, 1992

[54] ARRANGEMENT FOR COLLECTING AND MIXING LIQUID IN A COUNTER-CURRENT COLUMN

[75] Inventors: Lorenzo Ghelfi, Uster; Raymond C. Pluss, Klein-Andelfingen, both of Switzerland

[73] Assignee: Sulzer Brothers Limited, Winterthur, Switzerland

[21] Appl. No.: 709,482

[22] Filed: Jun. 3, 1991

[30] Foreign Application Priority Data

Jun. 13, 1990 [CH] Switzerland ............... 01975/90

[51] Int. Cl.$^5$ .................................................. B01F 3/04
[52] U.S. Cl. .................................................. 261/97
[58] Field of Search .................................................. 261/97

[56] References Cited
U.S. PATENT DOCUMENTS

| | | | |
|---|---|---|---|
| 3,259,380 | 7/1966 | Brown | 261/97 |
| 3,977,834 | 8/1976 | Alcock et al. | 261/97 |
| 4,427,605 | 1/1984 | Meier et al. | 261/97 |
| 4,472,325 | 9/1984 | Robbins | 261/97 |
| 4,808,350 | 2/1989 | Robbins et al. | 261/97 |

FOREIGN PATENT DOCUMENTS

1501390 6/1969 Fed. Rep. of Germany .

*Primary Examiner*—Tim Miles
*Attorney, Agent, or Firm*—Kenyon & Kenyon

[57] ABSTRACT

An arrangement of troughs is disposed above a liquid/-distribution tray in a counter-current column for collecting and mixing liquid from an upper exchange portion prior to distribution onto the tray. The arrangement includes duct-like troughs each of which has a base with a closed first part and a second part with at least one outlet for liquid. As a result, the liquid trickled into each trough is mixed transversely prior to being expelled onto the distributor tray thus levelling out any differences in concentration along the length of the trough.

16 Claims, 5 Drawing Sheets

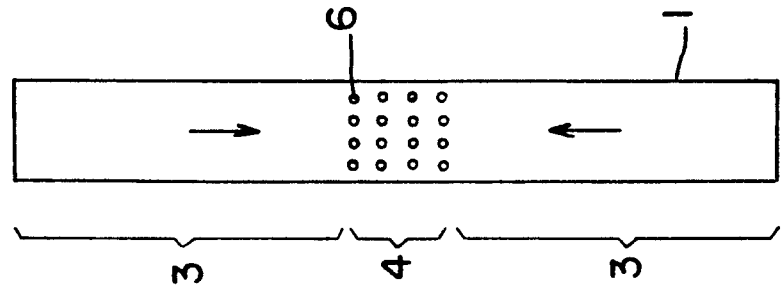
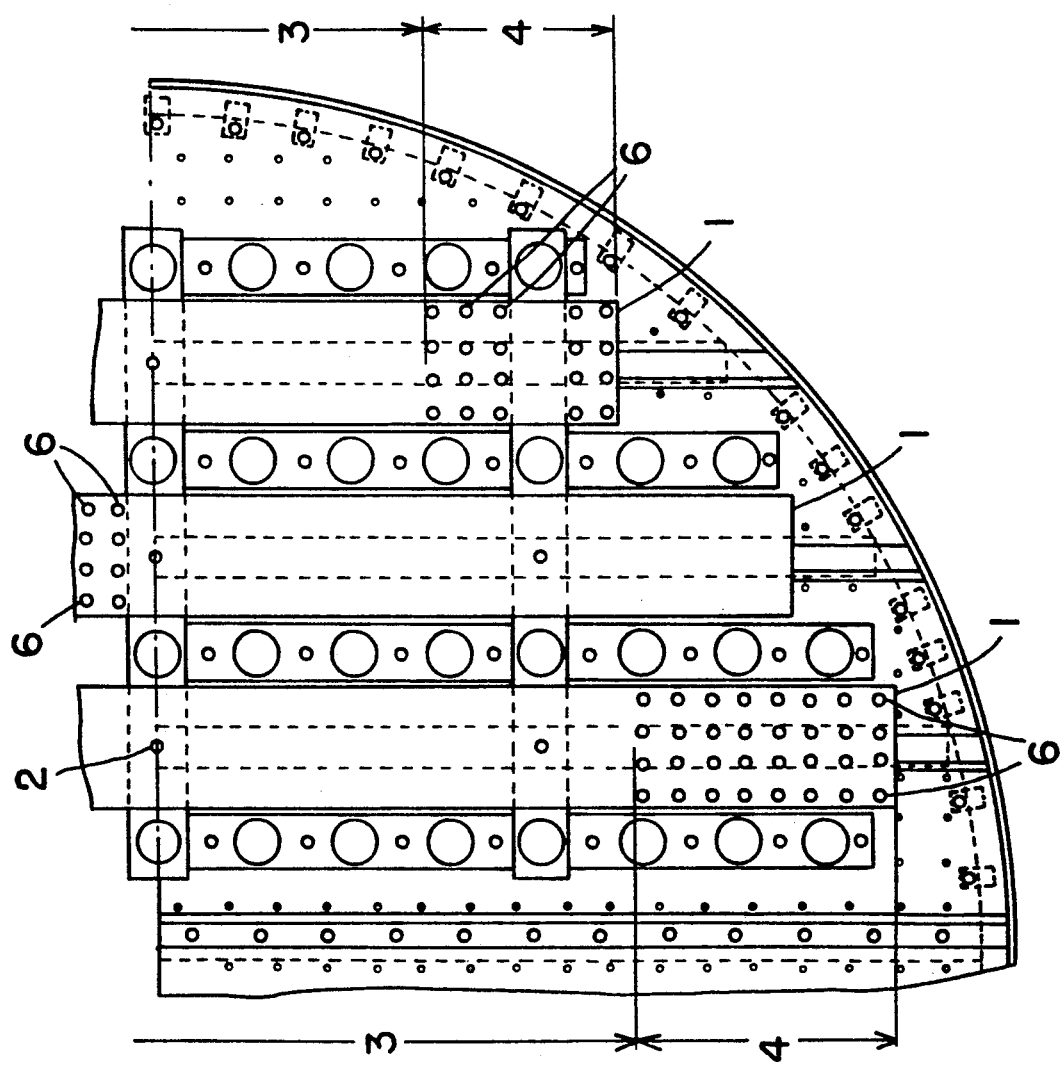

ARRANGEMENT FOR COLLECTING AND MIXING LIQUID IN A COUNTER-CURRENT COLUMN

This invention relates to an arrangement for collecting and mixing liquid in a counter-current column. More particularly, this invention relates to an arrangement for collecting and mixing liquid over a distribution tray within a counter-current column.

As is known, various types of counter-current columns have been constructed in which a counter-current flow of liquid and gas (vapor) may take place. In some cases, gas/liquid distributors have been positioned between two exchange portions of the counter-current columns, for example as described in Swiss Patent 642,566 wherein the distributor is constructed with a base on which liquid may collect, a plurality of upstanding vapor flues through which rising vapor may ascend and a plurality of tubes in the base for draining off liquid in a downward direction.

Hitherto, the liquid has been directly collected on the distributor base without any means of previously mixing the liquid across the cross-section of the column. However, the distributors have not been able to adequately mix the liquid throughout the cross-section since no transverse flows occur. As a result, any concentration gradients are maintained and transmitted to the part of the column below the distributor, thus reducing the efficiency of the column.

Accordingly, it is an object of the invention to be able to transversely mix liquid in a space between exchange portions of a counter-current column.

It is another object of the invention to improve the efficiency of a counter-current column.

Briefly, the invention is directed to a counter-current column having at least two vertically spaced apart exchange portions and a distribution tray disposed between the exchange portions for distributing a descending flow of liquid onto a lower one of the exchange portions while directing an ascending flow of gas into an upper one of the exchange portions.

In accordance with the invention, an arrangement is disposed between the exchange portions and above the distribution tray for collecting and mixing liquid from the upper exchange portion prior to distribution onto the tray. This arrangement includes at least two duct-like troughs each of which has a base with a closed first part and a second part with at least one outlet for liquid.

In one embodiment, the outlet for liquid in a respective trough is disposed at one end of the trough. Alternatively, the outlet may be disposed within a central part of the trough. In either case, the outlet may be formed by a plurality of openings which are distributed over not more than one-half the length of the trough and, preferably one-quarter of the length of the trough.

The troughs of the arrangement may be disposed in an alternating manner so that the outlets are disposed at diametrically opposite ends from one trough to the next. Further, a trough with an outlet in a central part may be disposed between two troughs where the outlets are at opposite ends.

As a result of the asymmetrical distribution and the concentration of outlet openings along part of the base of a trough, a transverse flow automatically occurs in the trough and results in a transverse mixing of the liquid.

The liquid can be particularly efficiently collected and mixed where the outlets of troughs on the same level are alternately disposed and/or if troughs having outlets in the middle are disposed between troughs having outlets at the end. A further improvement is obtained if at least two layers of troughs are disposed at different levels with their longitudinal axes at an angle to one another.

A trough can be constructed in a very simple manner if the outlet is disposed at one end of the trough and formed, for example by omitting an end wall.

These and other objects and advantages of the invention will become more apparent from the following detailed description taken in conjunction with the accompanying drawings wherein:

FIG. 2A illustrates a view in section perpendicular to a column axis showing part of a column cross-section and an arrangement of troughs therein;

FIG. 2B illustrates a top view of a trough for distributing liquid in accordance with a second embodiment of the invention.

Figure 1:
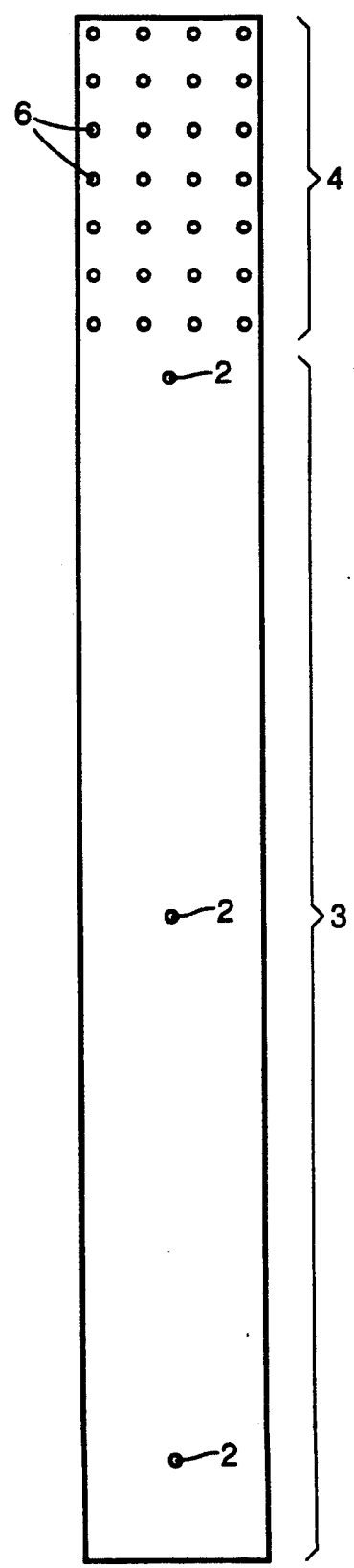
FIG. 1 illustrates a top view of a trough for distributing liquid in accordance with the invention.

Referring to FIG. 1, a duct-like trough 1 is formed of an elongated body having a base in which bores 2 are provided through which screws pass in order to secure the trough 1 to a supporting grid (not shown). As indicated, the base of the trough is divided into a closed part 3 and a part 4 having an outlet for liquid. For example, the outlet is formed of a plurality of openings 6 which are concentrated at one end of the trough 1 or, alternatively, in a middle part as indicated in FIG. 2. These openings 6 are distributed over a length of trough which is not more than one-half and preferably one-quarter of the overall trough length. Alternatively, the outlet may be disposed in another region along the trough.

Figure 3:
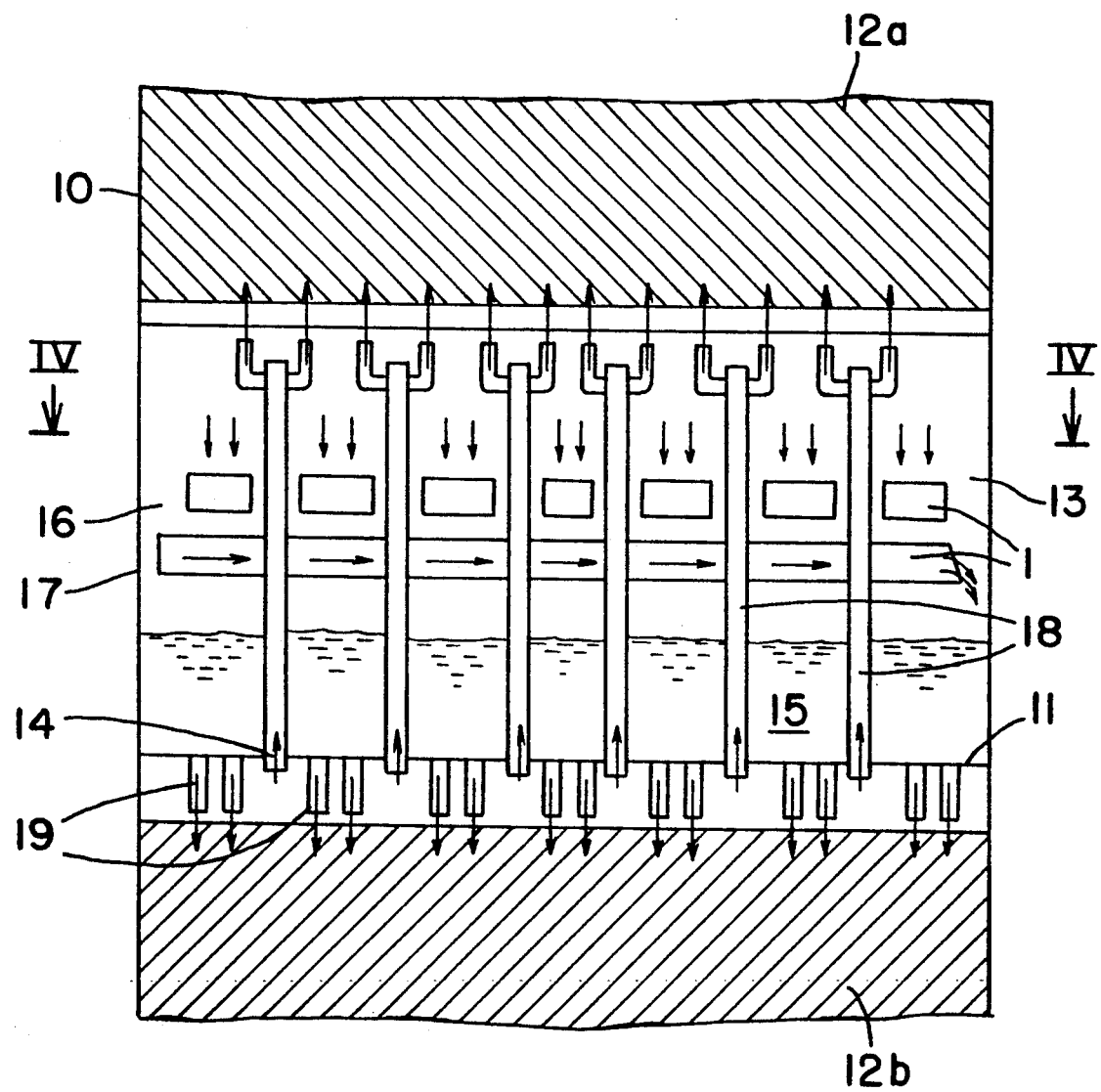
FIG. 3 illustrates a part cross-sectional view of a counter-current column employing a gas/liquid distributor with an arrangement of troughs above the distributor in accordance with the invention.
Figure 4:
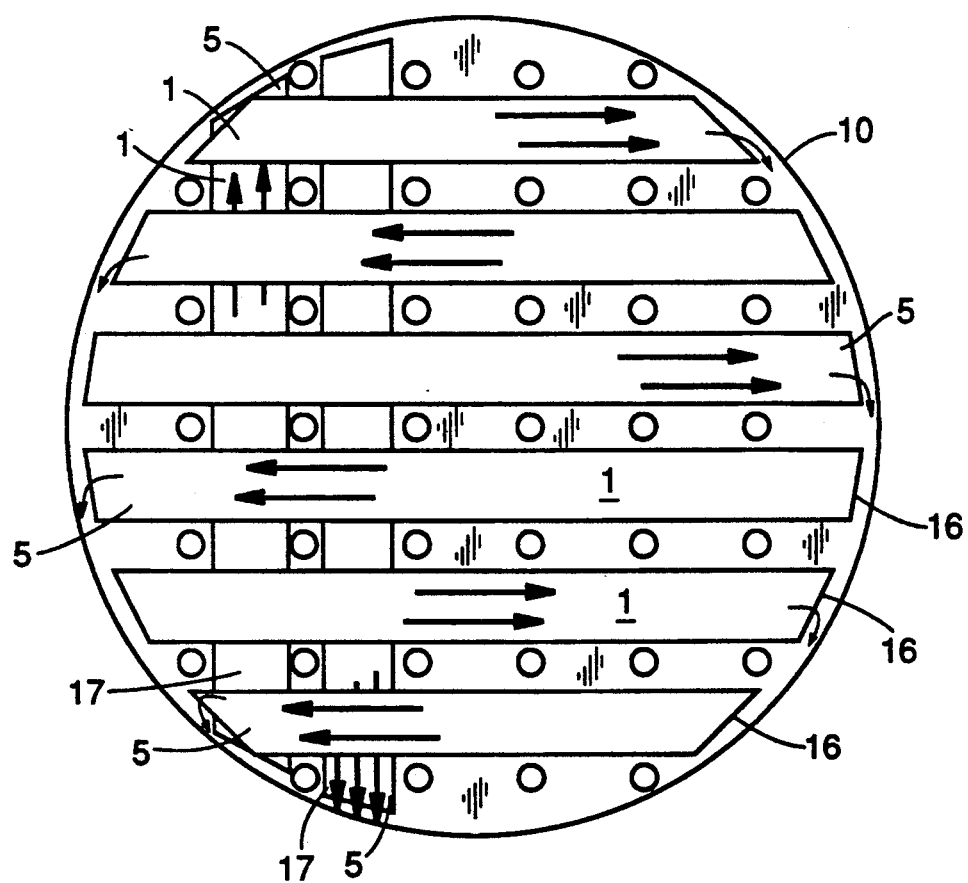
FIG. 4 illustrates a plan view of a perpendicular arrangement of troughs in accordance with the invention and taken on line IV—IV of FIG. 3.
Figure 5:
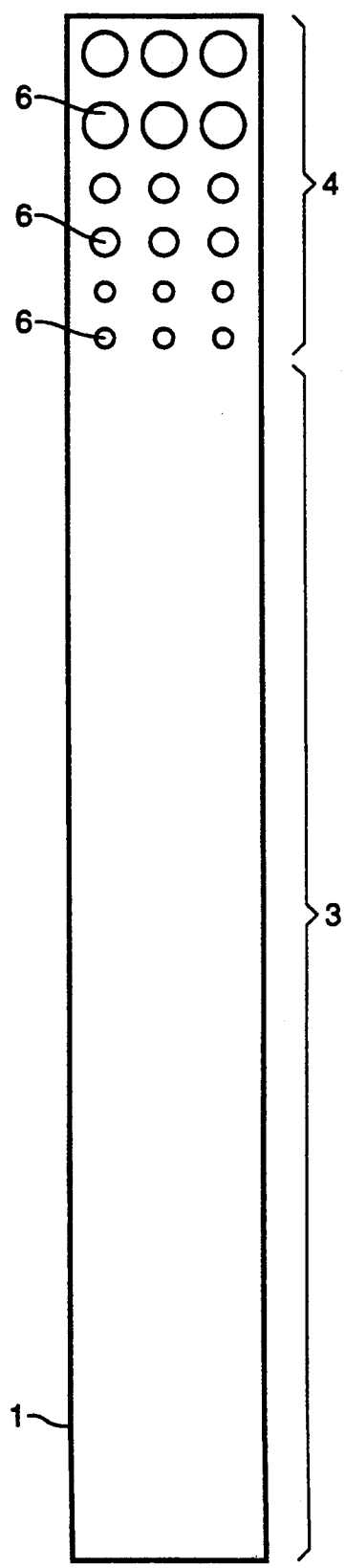
FIG. 5 illustrates a top view of a trough for distributing liquid in accordance with a third embodiment of the invention.

Advantageously, the outlet of the trough 1 is disposed at the end and is formed by omitting an end wall of the trough as shown in FIGS. 3 and 4.

The openings 6 are shown in FIG. 1 to be of a uniform size with a uniform spacing. However, the openings 6 may be of different sizes from each other and may be of increasing size in a direction toward the end of the trough.

Referring to FIG. 3, a high-pressure distillation counter-current column 10 is provided with a multiplicity of exchange portions, only two of which 12a, 12b are shown. The exchange portions 12a, 12b may be formed, for example of regular packing elements as are known and define a free space 13 therebetween. As also indicated, a gas/liquid distributor 14 is disposed in the space 13 in order to distribute gas and liquid between the two exchange portions 12a, 12b. As indicated, the distributor 14 has a base or tray 11 which extends across the cross-section of the column 10 and which is supported, for example, by brackets on a wall of the column 10. This tray 11 serves to collect descending liquid thereon.

In addition, the distributor 14 has a number of vapor flues 18 which extend upwardly in order to convey vapor from the lower exchange portion 12b to the upper exchange portion 12a. In addition, a plurality of tubes 19 extend through the tray 11 in order to convey liquid from on the tray 11 into the lower exchange portion 12b. As is known the flues 18 and tubes 19 provide for a separation of the ascending vapor from the descending liquid.

As also shown in FIGS. 3 and 4, two layers of troughs extend over the entire cross-section of the column 10 within the space 13 and above the level of liquid on the tray 11 of the gas/liquid distributor 14. As indicated, each layer 16, 17 of troughs is formed of a plurality of parallel troughs 1 with the troughs of one layer turned perpendicularly to the troughs of the other layer. In other possible arrangements, the troughs of the two layers 16, 17 may be at an oblique angle to one another.

Referring to FIG. 4, each trough 1 has an outlet 5 at one end which is formed by omitting the end wall thereat. Accordingly, liquid falling into each trough 1 flows in the direction of the outlet, as indicated by the arrows. As a result, the liquid trickling along a trough over the entire column cross-section is collected and thoroughly mixed before flowing from the trough 1 into the lake of liquid on the tray 11 of the distributor 14 as indicated in FIG. 3. Mixing is further promoted by the fact that the "outflow" ends of the troughs 1 in each layer 16, 17 point alternately in diametrically opposite directions as shown in FIG. 4. This produces flows in the "lake" of liquid on the tray 11 and also brings about some mixing.

As indicated in FIG. 2A, the troughs which are disposed in a common horizontal plane may have some troughs with an outlet at one end while other troughs are provided with outlets in a central part.

It is to be noted that the arrangement of troughs may be utilized within a suitable gas/liquid distributor other than that as described above.

The invention thus provides an arrangement for collecting and mixing liquids over a distributing tray between two exchange portions of a counter-current column. Further, the invention provides for a mixing of the descending liquid from an exchange portion of a counter-current column before feeding to a gas/liquid distributor.

The invention further provides an arrangement of troughs which serve to level out any differences in concentration in a liquid trickling into the troughs by transversely mixing the liquid along the length of the troughs prior to feeding to a distributor.

What is claimed is:

1. In combination,
a counter-current column having at least two vertically spaced apart, exchange portions;
a distribution tray disposed between said exchange portions for distributing a descending flow of liquid onto a lower one of said exchange portions while directing an ascending flow of gas into an upper one of said exchange portions; and
an arrangement disposed between said exchange portions and above said distribution tray for collecting and mixing liquid from said upper exchange portion prior to distribution onto said tray, said arrangement including at least two duct-like troughs, each said trough having a base with a closed first part and a second part with at least one outlet for liquid.

2. The combination as set forth in claim 1 wherein said outlet is disposed at one end of said trough.

3. The combination as set forth in claim 1 wherein said outlet includes a plurality of openings distributed over not more than one-half the length of said trough.

4. The combination as set forth in claim 3 wherein said openings are of different sizes and are of increasing size in a direction toward one end of said trough.

5. The combination as set forth in claim 3 wherein said openings are disposed in a central part of said trough.

6. The combination as set forth in claim 1 having a plurality of said troughs in a common horizontal plane with some of said troughs having said outlet at one end thereof and with said outlets of a number of said troughs pointing in diametrically opposite directions.

7. The combination as set forth in claim 1 having a plurality of said troughs in a common horizontal plane with alternating troughs having said outlet thereof disposed in a central point of said trough and an end of said trough respectfully.

8. The combination as set forth in claim 1 having a plurality of said troughs disposed in at least two horizontal planes with said troughs in one plane being disposed angularly of said troughs in the other plane.

9. In combination,
a counter-current column having at least two vertically spaced apart exchange portions;
for distributing a descending flow of liquid onto a lower one of said exchange portions while directing an ascending flow of gas into an upper one of said exchange portions; and
an arrangement disposed between said exchange portions and above said distribution tray for collecting and mixing liquid from said upper exchange portion prior to distribution onto said tray, said arrangement including a plurality of duct-like troughs disposed in a common horizontal plane, at least some of said troughs having a closed first part and a second part with an outlet at one end thereof for liquid.

10. The combination as set forth in claim 9 wherein some of said troughs have a second part with an outlet in a central part thereof.

11. The combination as set forth in claim 10 wherein said troughs with said outlet in a central part alternate with said troughs with said outlet in an end thereof.

12. The combination as set forth in claim 11 wherein said troughs with said outlet in an end thereof are disposed in alternating manner to position said outlets at diametrically opposite positions.

13. The combination as set forth in claim 9 wherein said openings are of different sizes and are of increasing size in a direction toward one end of said trough.

14. The combination as set forth in claim 9 having a plurality of said troughs disposed in at least two horizontal planes with said troughs in one plane being disposed angularly of said troughs in the other plane.

15. The combination as set forth in claim 9 wherein said closed first part extends over at least one-half the length of each trough.

16. The combination as set forth in claim 9 wherein said closed first part extends over at least one-quarter the length of each trough.

* * * * *

UNITED STATES PATENT AND TRADEMARK OFFICE
CERTIFICATE OF CORRECTION

PATENT NO. : 5,158,713

DATED : October 27, 1992

INVENTOR(S) : Ghelfi et al.

It is certified that error appears in the above-indentified patent and that said Letters Patent is hereby corrected as shown below:

Column 3, line 11, change "troughs" to --troughs 1--; and

Column 4, line 31, before "for" insert --a distribution tray disposed between said exchange portions--.

Signed and Sealed this

Twelfth Day of April, 1994

Attest:

BRUCE LEHMAN

Attesting Officer

Commissioner of Patents and Trademarks